(No Model.)
S. ELDRIDGE.
FASTENER FOR OUTSIDE SASHES.
No. 558,050. Patented Apr. 14, 1896.
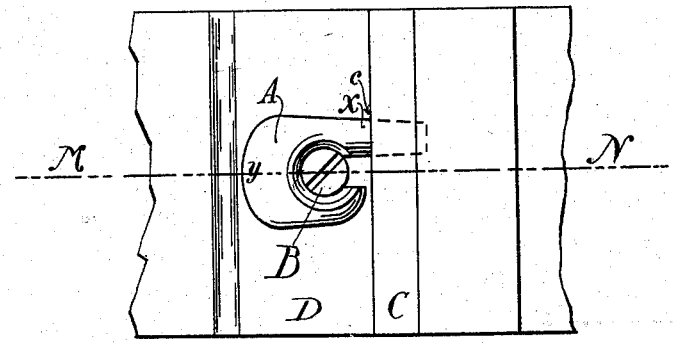
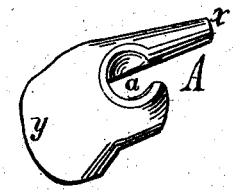
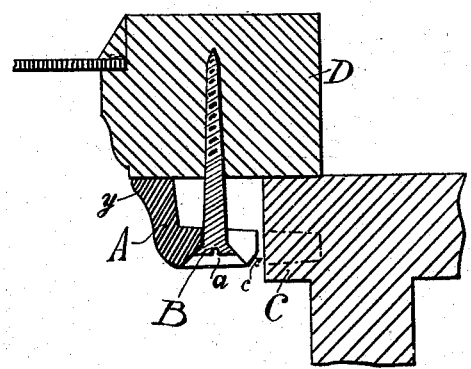
WITNESSES
INVENTOR

UNITED STATES PATENT OFFICE.

SAMUEL ELDRIDGE, OF DEXTER, MAINE.

FASTENER FOR OUTSIDE SASHES.

SPECIFICATION forming part of Letters Patent No. 558,050, dated April 14, 1896.

Application filed August 5, 1895. Serial No. 558,202. (No model.)

*To all whom it may concern:*

Be it known that I, SAMUEL ELDRIDGE, a citizen of the United States, residing at Dexter, in the county of Penobscot and State of Maine, have invented certain new and useful Improvements in Inside Fasteners for Outside Windows; and I do hereby declare the following to be a full, clear, and exact description of the invention, such as will enable others skilled in the art to which it appertains to make and use the same.

My invention consists of an improved inside fastener for outside windows and is fully illustrated in the accompanying drawings, in which—

Figure 1 is a perspective view of fastener. Fig. 2 is an elevation of outside window-sash and window-frame secured together by fastener. Fig. 3 is a horizontal cross-section of frame, sash, and fastener in position on line M N.

Similar letters refer to corresponding parts throughout the figures.

The object of my invention is to provide a means of fitting, securing, and removing outside windows and screens to and from the window-frames from within the building, and so saving the trouble and expense of placing, securing, and removing them from the outside and dispensing with the use of ladders and awkward and troublesome outside work from insecure or dangerous positions.

My device consists of a fastener A, having a smooth shank $x$ and a strut or lug $y$ projecting downward from the head of the bolt approximately at a right angle, forming an elbow and terminating in a flat base or bearing. The slot $a$ of the fastener is formed of such diameter as to receive the shank of a screw-bolt B and is countersunk to receive the head of the screw-bolt, and so when the head of the screw-bolt is in the countersink lock the screw-bolt and fastener together and prevent their separation by lateral motion.

In operation sockets $c$ for the shanks of the fasteners having been bored in the window-frames C, the screw-bolts B are partially screwed into the sashes of the outside windows, which are then passed outward from within and held in position temporarily in any convenient manner. The shanks of the fasteners are introduced into the sockets in the window-frame, the slot in the fasteners admitting the shanks of the screws, and each screw-bolt is then screwed down until its head occupies the countersink in the slot, and the base of the lug $y$ bears firmly upon the sash and affords a support for the head of the fastener against the forward pressure of the screw-bolt. Two or three turns of the screw are sufficient for locking or unlocking the parts.

Having thus described my invention, what I claim, and desire to secure by Letters Patent, is—

An outside-window fastener having a smooth shank and a strut or lug elbowing from the head of the bolt, and having its head bored through at a right angle to the length of the bolt, said bore being slotted out on the side toward the shank to permit the entrance of the fastening-screw, all as and for the purposes set forth.

SAMUEL ELDRIDGE.

Witnesses:
　THOS. H. B. PIERCE,
　WARREN H. CARR.